United States Patent
Freeman

[11] Patent Number: 5,967,592
[45] Date of Patent: Oct. 19, 1999

[54] HOLLOW FRP BUMPER

[75] Inventor: Richard Benjamin Freeman, Oxford, Mich.

[73] Assignee: The Budd Company, Troy, Mich.

[21] Appl. No.: 09/162,190

[22] Filed: Sep. 28, 1998

Related U.S. Application Data

[60] Provisional application No. 60/079,031, Mar. 23, 1998.

[51] Int. Cl.$^6$ .................................................. B60R 19/03
[52] U.S. Cl. ........................................... 296/120; 296/122
[58] Field of Search ..................................... 293/120, 122

[56] References Cited

U.S. PATENT DOCUMENTS

| | | |
|---|---|---|
| 3,883,168 | 5/1975 | Goupy et al. . |
| 3,895,835 | 7/1975 | Thomson . |
| 4,208,069 | 6/1980 | Huber et al. ............................. 293/102 |
| 4,241,945 | 12/1980 | Huber et al. ............................. 293/120 |
| 4,252,355 | 2/1981 | Goupy et al. ............................. 293/120 |
| 4,408,790 | 10/1983 | Shimoda et al. ......................... 293/122 |
| 4,440,429 | 4/1984 | Eyb ........................................... 293/120 |
| 4,466,646 | 8/1984 | Delmastro et al. ...................... 293/117 |
| 4,525,005 | 6/1985 | Provchaska et al. .................... 293/117 |
| 4,586,738 | 5/1986 | Butler et al. ............................. 293/107 |
| 4,671,550 | 6/1987 | Molnar ..................................... 293/120 |
| 4,724,115 | 2/1988 | Freeman . |
| 4,740,346 | 4/1988 | Freeman . |
| 4,749,613 | 6/1988 | Yamada et al. .......................... 293/120 |
| 4,764,409 | 8/1988 | Freeman . |
| 4,849,147 | 7/1989 | Freeman . |
| 4,863,771 | 9/1989 | Freeman . |
| 4,940,270 | 7/1990 | Yamazaki et al. ....................... 293/122 |
| 5,000,990 | 3/1991 | Freeman . |
| 5,039,465 | 8/1991 | Freeman et al. . |
| 5,071,500 | 12/1991 | Kumagai et al. ........................ 293/120 |
| 5,122,398 | 6/1992 | Seiler et al. ............................. 293/120 |
| 5,123,688 | 6/1992 | Takado et al. ........................... 293/120 |
| 5,141,273 | 8/1992 | Freeman . |
| 5,286,326 | 2/1994 | Greve . |
| 5,658,027 | 8/1997 | Eissinger et al. ....................... 293/120 |
| 5,685,956 | 11/1997 | Greve . |

FOREIGN PATENT DOCUMENTS

| | | | |
|---|---|---|---|
| 0055364 | 7/1982 | European Pat. Off. ............... 293/122 |
| 2708856 | 10/1977 | Germany ............................... 293/122 |
| 62-240514 | 11/1986 | Japan . |
| 404201753 | 7/1992 | Japan ..................................... 293/120 |

OTHER PUBLICATIONS

Owens/Corning Fiberglas, "Textile Fibers For Industry", 1979 (2 pages).

Compet rpc Fibers, "Compet Fibers for Plastics Reinforcement", 1984 (3 pages).

*Primary Examiner*—Dennis H. Pedder
*Attorney, Agent, or Firm*—Harness, Dickey & Pierce, P.L.C.

[57] ABSTRACT

A composite fiber reinforced plastic (FRP) bumper includes an energy absorbing outer shell which is spaced from a rigid inner beam. The outer shell deforms under low impact loads and serves as an energy absorber. Upon high impact loads, the shell abuts the inner beam which, in turn, transfers the loads to the vehicle frame.

7 Claims, 4 Drawing Sheets

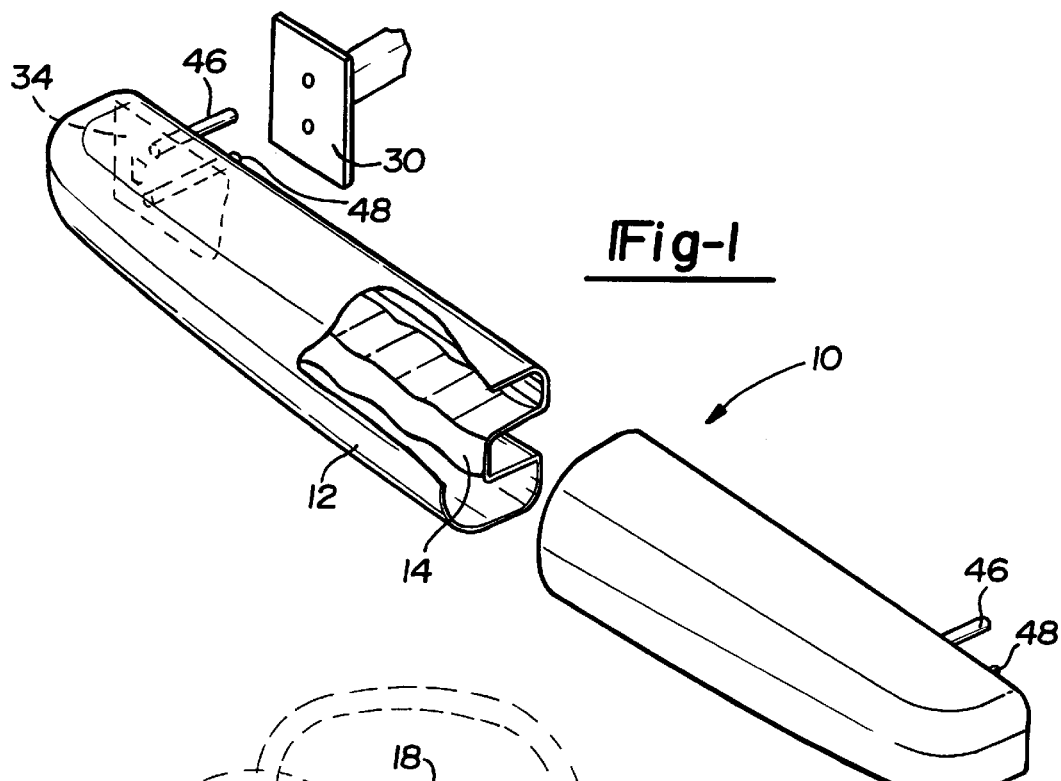
Fig-1
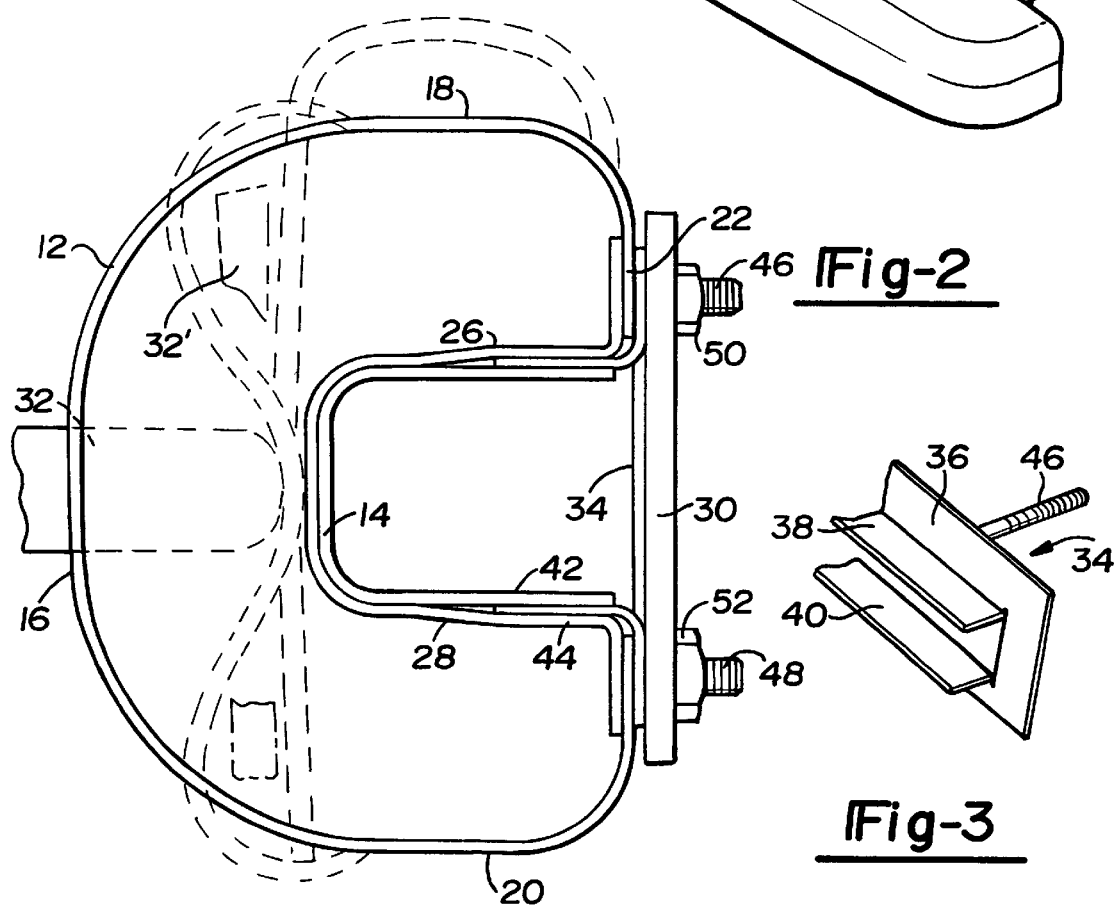
Fig-2
Fig-3

HOLLOW FRP BUMPER

This application claims the benefit of U.S provisional application Ser. No. 60/079,031 filed Mar. 23, 1998.

BACKGROUND OF THE INVENTION

1. Technical Field

This invention relates to automotive bumpers and, more particularly, to bumpers made of fiber reinforced plastic (FRP).

2. Discussion

While automotive bumpers have traditionally been made of metal, the patent literature has suggested that plastic bumpers may offer certain advantages such as weight savings and the like over their metal counterparts. One such patent is U.S. Pat. No. 5,141,273 which issued on Aug. 25, 1992 to the same inventor and assignee as the present application. This patent recognizes that certain benefits can be achieved by using a combination of thermoplastic and glass fibers in connection with a given resin system to provide a bumper that can sustain high strains and deformation upon an impact force.

The present invention, likewise, is drawn to an improved fiber reinforced plastic (FRP) bumper construction that provides still further advantages.

SUMMARY OF THE INVENTION

In accordance with the teachings of the present invention, a fiber reinforced hollow bumper for a vehicle includes an outer shell having flexible fibers dispersed therein. In addition, the bumper includes an inner beam made of fiber reinforced plastic with rigid fibers dispersed therein. The outer shell is designed to elastically deform under low impact loads and serve as a low energy absorber. Since the shell is made of flexible fibers and a flexible resin, the shell will return to its original state after the load has been removed. On the other hand, the shell will deform sufficiently to contact the inner beam under high loads. The inner beam, being rigid, transmits the remaining unabsorbed load energy to the rails of the car frame to which the bumper is attached.

A method of making hollow bumpers is also disclosed which contemplates the use of several preforms made from a slurry process which are arranged in a mold into which resin is injected into all of the preforms to bind them together into a unitary structure. Preferably, a metal plate on the rear wall of the bumper is also employed. The plate has flange portions sandwiched between certain of the preforms so that the metal plate becomes integrally formed with the remainder of the FRP bumper.

BRIEF DESCRIPTION OF THE DRAWINGS

Various advantages of the present invention will become apparent to those skilled in the art after reading the following specification and by reference to the drawings, in which:

FIG. 1 is a perspective view, with parts cut away, of a bumper made in accordance with teachings of the present invention;

FIG. 2 is a cross sectional view of the bumper;

FIG. 3 is a perspective view of the metal plate used in the bumper;

DESCRIPTION OF THE PREFERRED EMBODIMENT

Figure 4:
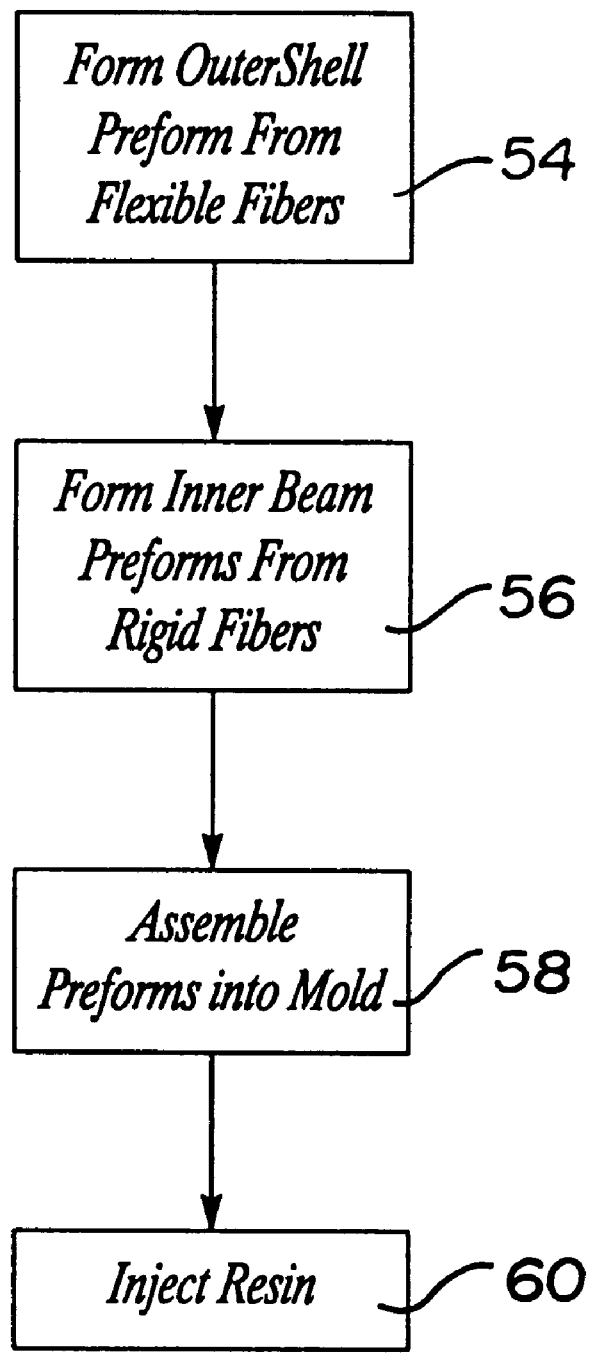
FIG. 4 is a flow chart of a method for making the bumper.

It should be understood that this description describes the best mode of currently practicing the invention but that the invention is not limited to the specific example which follows. Instead, the scope of this invention is defined by the claims as properly construed in accordance with the inventor's contribution to the art, keeping in mind that various modifications to this specific example will be suggested by the teachings herein.

With that caveat in mind, the reader's attention is drawn to FIGS. 1–3 where bumper 10 is shown as including a deformable outer shell 12 and a rigid inner beam 14. Outer shell is generally C-shaped in cross section and includes a front wall 16, top wall 18, bottom wall 20 and rear wall 22. Outer shell 12 is made of fiber reinforced plastic in which flexible fibers are dispersed in a plastic resin. Preferably, the fibers have high elongation characteristics as provided, for example, by polyester fibers of about 1–2 inch in length. The flexible resin system should have high elongation characteristics, as well. A thermosetting resin is preferable, especially a urethane system, although vinyl ester resin can be used as well.

Many of the details of the characteristics of the polyester fibers, the resin system, and the E-glass fibers used for inner beam 14 to be discussed later herein is disclosed in more detail in the aforementioned U.S. Pat. No. 5,141,273 which is hereby incorporated by reference. Thus, these details need not be reiterated here.

The inner beam 14 presents a front wall, top wall 26 and bottom wall 28 which generally parallel their respective counterparts in shell 12. However, unlike shell 12, inner beam 14 is much more rigid and does not tend to elastically deform under load. Instead, rigid beam 14 serves to transmit the loads to the vehicle frame rails, one of which is diagrammatically shown in FIG. 1 with reference numeral 30. Inner beam 14 is also made of fiber reinforced plastic. The fibers therein are preferably randomly oriented E-glass fibers about 1–2 inches in length. While the E-glass fibers have a much lower modulus of elasticity than the thermoplastic fibers of shell 12, the thermoplastic fibers have a much higher breaking elongation. As a result, the outer shell 12 can deform under small loads and serve as energy absorbers, with the shell returning to its original shape after removal of the load. Upon high impact loads, as represented by the dotted lines in FIG. 2, the impacting object 32 or 32' deforms the shell 12 until it abuts the front wall of the inner beam 14. Inner beam 14 transmits the remaining load to the frame rails to absorb its energy and prevent as much damage to the vehicle as possible.

A metal plate 34 is provided along with the FRP components of bumper 10. The metal plate 34 runs substantially the entire length of bumper 10 and includes an outer frame portion 36 and a pair of orthogonally directed flanges 38 and 40. Flanges 38 and 40 are sandwiched between two preforms 42 and 44 which make up inner beam 14. The frame portion 36 lies adjacent to the rear wall of the bumper. Upper and lower portions of the frame 36 include fastener bolts 46, 48 which pass through openings in frame rail 30 to receive suitable nuts 50, 52 to mount the bumper 10 onto the two side rails of the vehicle frame. In addition to attaching the bumper 10 to the rails, metal plate 34 also serves as a type of cross member to maintain the spacing of the side rails. In addition, the metal plate 34 serves another function in so-called "offset impact" situations, i.e., wherein the impacting load contacts the bumper 10 at an angle instead of head-on. Under these circumstances, the metal plate 34 provides cross-car strength to bring the non-impacted frame side rail into deformation thereby distributing the impact load throughout the entire frame of the vehicle.

Figure 5:
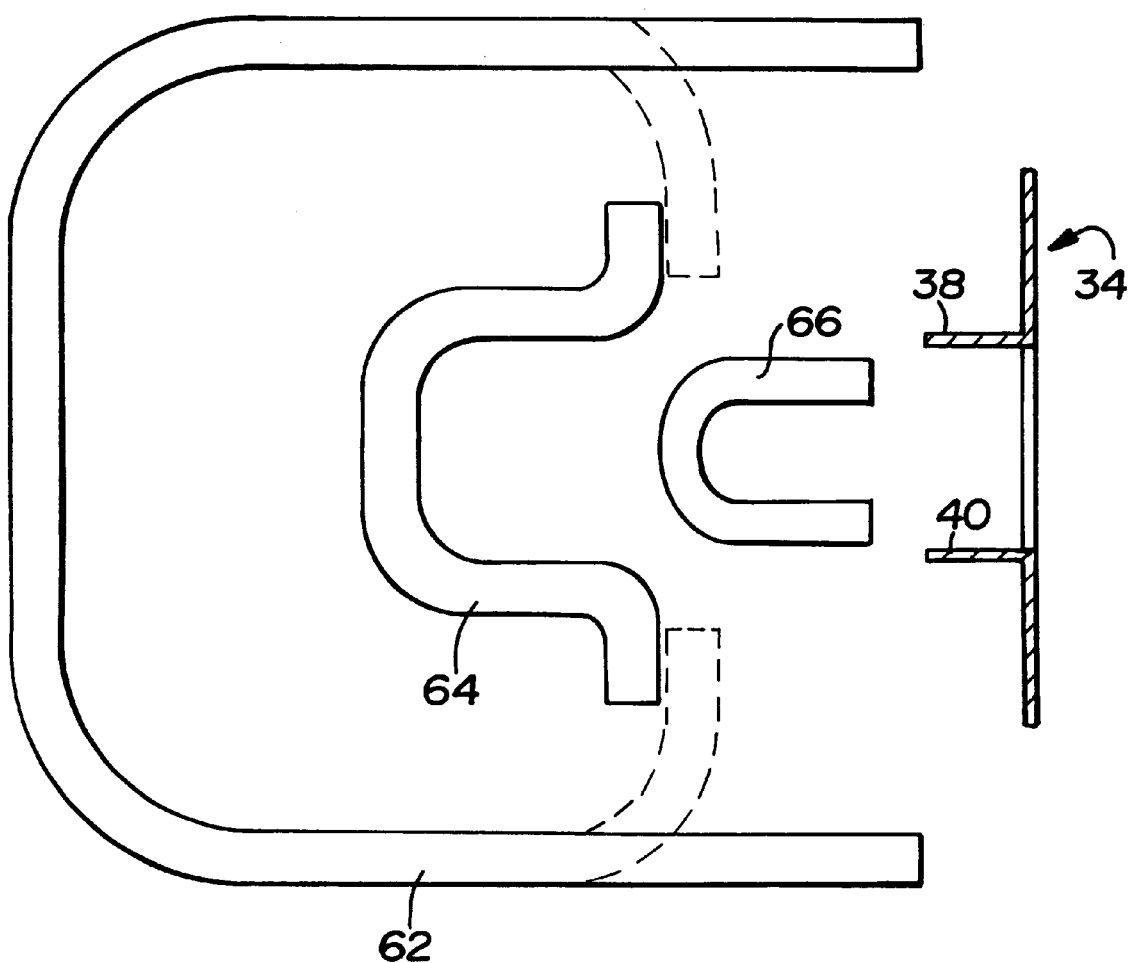
FIG. 5 is an exploded side view of certain major components of the bumper.

Turning now to FIGS. 4–5, the method of making the bumper 10 will now be described. Step 54 in FIG. 4 represents the first step in which fiber preforms are created. Basically three preforms are utilized in the invention as illustrated in FIG. 5. These preforms are the large C-shaped preform 62 made of polyester fibers which forms the outer shell 12. Two preforms 64 and 66 are made of glass fibers and are used to define the inner beam 14. Preforms 62, 64 and 66 are preferably made by the so-called "slurry" process which is disclosed, for example, in U.S. Pat. Nos. 5,039,465; 5,286,326 and 5,685,956 which are commonly assigned to the assignee of the present invention and which are hereby incorporated by reference. Briefly, the slurry process utilizes a tank filled with water. Fibers are mixed with the water to create a slurry. A contoured screen having the shape of the desired preform is then raised through the slurry. The water passes through the screen while the fibers are deposited on the screen in a randomly oriented manner. The preform is then removed from the screen and dried to a sufficiently solid state so that it can be handled and later placed into mold for injecting resin into the preforms. In this invention, the preform 62 will be made with a slurry of polyester fibers whereas the preforms 64 and 66 will be formed from a slurry of glass fibers. All of the preforms would be made with different screens to correspond to the desired shapes as generally disclosed in FIG. 5.

Figure 6:
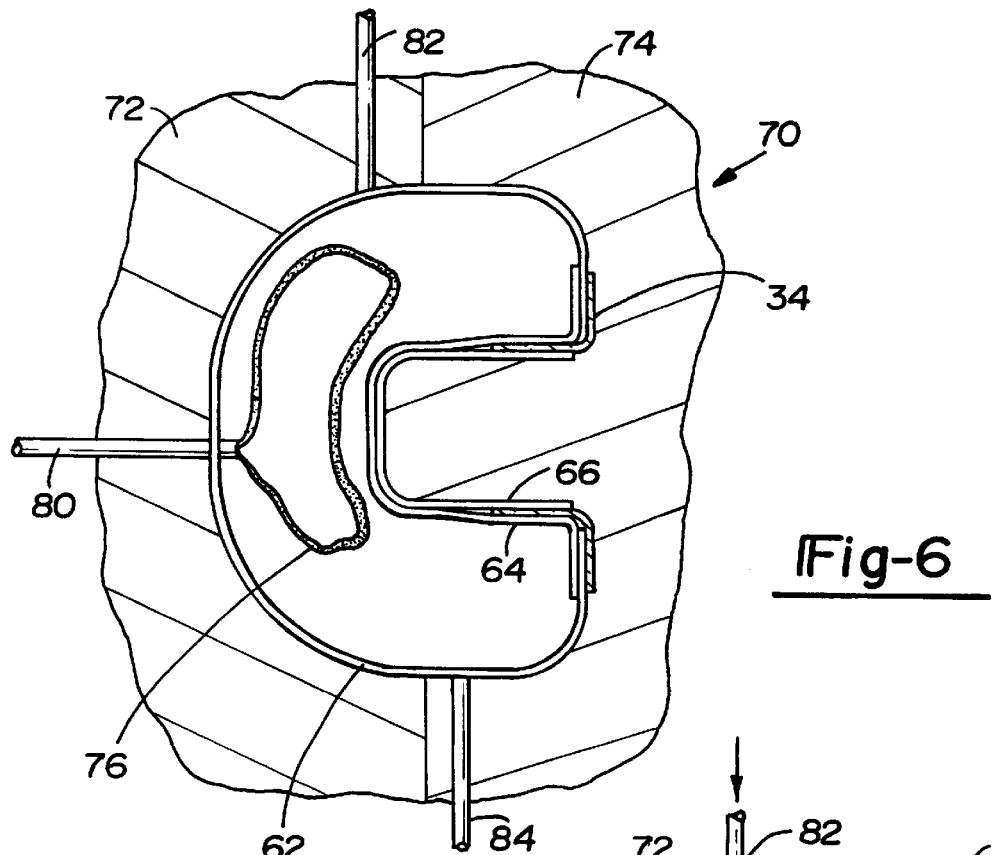
FIG. 6 is a cross sectional view of a preliminary step in the method of molding the bumper.
Figure 7:
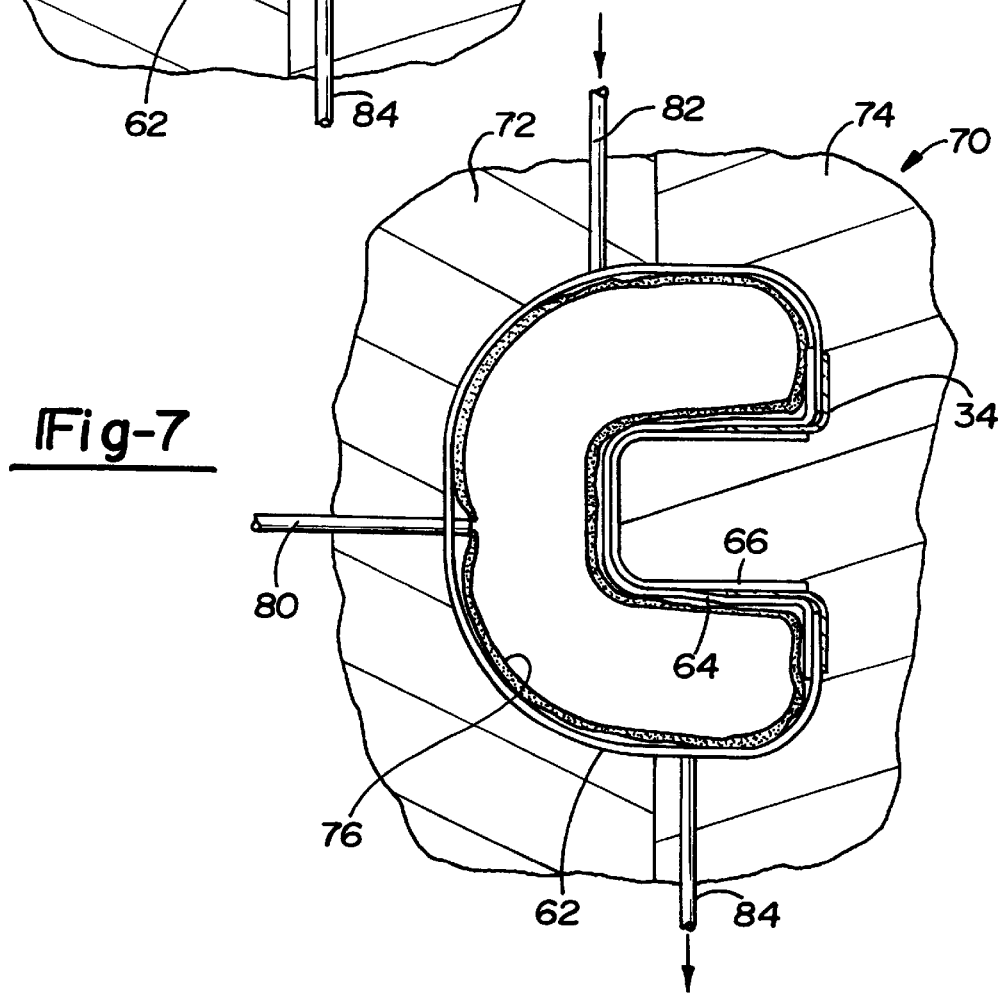
FIG. 7 is a cross sectional view of a subsequent step during the molding process.

FIGS. 6 and 7 illustrate the molding process. This process is sometimes referred to generally as "resin transfer molding" and the various details are disclosed in commonly assigned U.S. Pat. Nos. 4,740,346; 4,849,147; 5,667,860; 5,000,990 and 4,764,409 which are hereby incorporated by reference. A mold 70 employs a first die 72 and a second die 74. The interior surfaces presented by the dies 72, 76 cooperate to define the outer shape of bumper 10.

The dies are open and the preforms 62, 64, 66 along with metal plate 34 are laid about the molding surfaces of the dies 72, 74. Alternatively, the preforms can be attached to a thin shell-like support and the subassembly placed into the mold. In this embodiment, the dies 72, 74 are then closed and an inflatable member 76 is inserted into the mold cavity and a source of compressed air is connected via a suitable conduit 80 extending through die 72 and into the balloon-like member 76. The purpose of the compressed air is to expand the member 76 and maintain its shape during the subsequent resin injection step as shown in FIG. 7. Again, alternatively, a thin, self-supporting hollow body akin to a plastic milk jug can be used instead of the collapsible member 76 shown in the drawings. In this case, the preforms would be attached to the body which is then placed into the mold. Compressed air can be applied to prevent the body from collapsing when the resin is injected.

FIG. 7 illustrates the resin being injected through a conduit 82 into the interior cavity of the mold. The resin, here urethane resin, flows from conduit 82 throughout the preforms 62, 64, 66 to fully wet or impregnate the fibers. Excess resin exits the mold via conduit 84. Fill channels and vent channels (not shown) communicating with conduits 82 and 84, respectively, can be used to help promote an even distribution of resin flow throughout the entire mass of preforms. The injected resin thereby binds the preforms as well as the metal plate together in one unitary structure. Depending upon the resin system utilized, the mold 70 can be heated in order to cure the resin. Once the resin has been reasonably cured, the mold 70 is opened, the compressed air disconnected from inflatable member 76 and the bumper is removed from the mold. After the bumper is removed, it can be trimmed and painted as desired. It is then ready for attachment to the vehicle frame as discussed above.

The present invention replaces the numerous parts in existing bumpers with a basically one-piece molded composite bumper thereby eliminating costly assembly. It also eliminates the need for separate energy absorbers as is commonplace in metal designs. Since much of the metal has been replaced with plastic, the design of this invention tends to be lighter and it does not require any subsequent assembly of parts. The invention is capable of 5 mph and pole tests currently being expected of modern bumpers. The bumper design should be effective in offset barrier tests and gives latitutde in styling by reducing the amount of overhang that allows the bumper system room to absorb the impact energy.

Still other advantages of the present invention will become apparent to those skilled in the art after having the benefit of reading the foregoing specification and by reference to the claims which follow.

I claim:
1. A bumper for a vehicle, said bumper comprising:
   a first fiber reinforced preform defining an outer shell having a wall, said first preform having flexible fibers dispersed therein;
   at least one second fiber reinforced preform defining inner beam, said second prefrom having rigid fibers dispersed therein;
   said first and second preforms being impregnated with the same resin system; and
   said shell deforming and returning to its original state upon impact, while the inner beam is spaced from the wall of the shell and transmits high impact loads to the vehicle frame when the impact load is large enough to deform the shell until it abuts the inner beam.
2. The bumper of claim 1 wherein said flexible fibers are polyester fibers and wherein the rigid fibers are glass fibers.
3. The bumper of claim 1 which includes a metal plate having a frame portion extending longitudinally across a rear wall of the bumper, said metal plate serving to attach the bumper to side rails of the vehicle frame.
4. The bumper of claim 3 wherein said metal plate further includes at least one flange portion secured to the inner beam.
5. The bumper of claim 4 wherein the flange is sandwiched between two preforms defining the inner beam.
6. A bumper for a vehicle, said bumper comprising:
   an elongated C-shaped outer shell having a front wall, a top wall, a bottom wall, and a rear wall portion; said outer shell being a single preform of randomly oriented, flexible fibers impregnated with a urethane resin;
   an elongated C-shaped inner beam located within the boundaries of the shell, said inner beam having a front wall, a top wall, and a bottom wall; said front wall of the inner beam being spaced a given distance from the front wall of the outer shell, said inner beam being constructed of a pair of generally co-extensive preforms with glass fibers impregnated with the same urethane resin;

an elongated metal plate having a frame portion and a pair of flanges, said flanges being sandwiched between the inner beam preforms; and said metal plate including means for attaching the bumper to side rails of a vehicle frame.

7. A bumper for a vehicle, said bumper comprising:

a fiber reinforced outer shell having flexible fibers dispersed in a resin;

a fiber reinforced inner beam having rigid fibers dispersed in said resin;

said shell deforming and returning to its original state upon impact, while the inner beam is spaced from a wall of the shell and transmits high impact loads to the vehicle frame when the impact load is large enough to deform the shell until it abuts the inner beam; and said inner beam being connected to the vehicle frame by a flange sandwiched between two preforms defining the inner beam.

* * * * *